Figure 1:
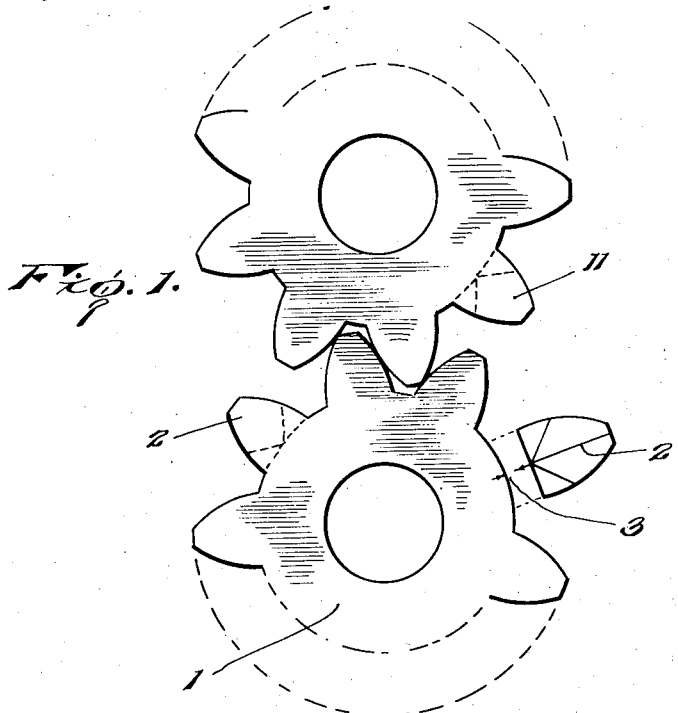

W. D. TROUTNER.
METHOD AND MEANS FOR INSERTING TEETH IN GEARS AND PINIONS.
APPLICATION FILED MAY 10, 1920.

1,406,110.

Patented Feb. 7, 1922.
2 SHEETS—SHEET 1.

Inventor
William D. Troutner.

By Lacy & Lacy, Attorneys

W. D. TROUTNER.
METHOD AND MEANS FOR INSERTING TEETH IN GEARS AND PINIONS.
APPLICATION FILED MAY 10, 1920.
1,406,110.
Patented Feb. 7, 1922.
2 SHEETS—SHEET 2.
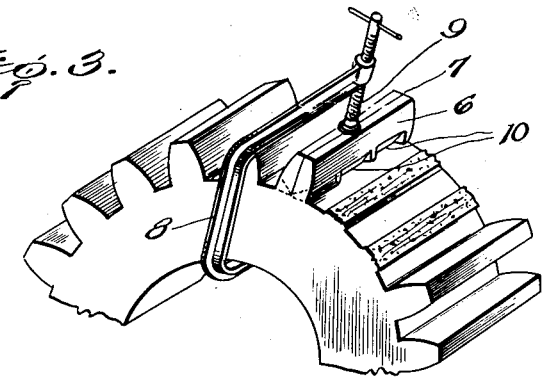
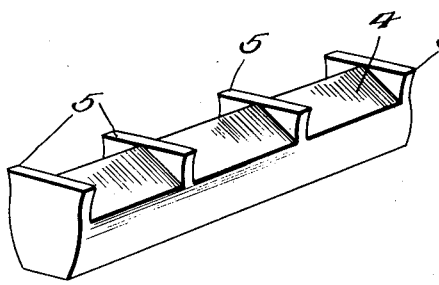
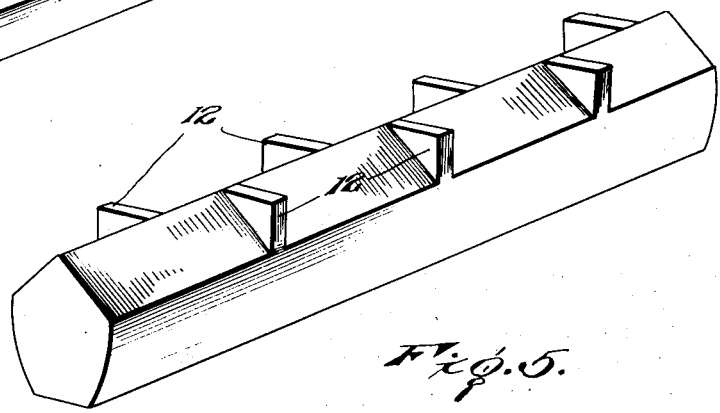
Inventor
William D. Troutner
By Lacey & Lacey, Attorneys

UNITED STATES PATENT OFFICE.

WILLIAM D. TROUTNER, OF PITTSFIELD, ILLINOIS.

METHOD AND MEANS FOR INSERTING TEETH IN GEARS AND PINIONS.

1,406,110.   Specification of Letters Patent.   Patented Feb. 7, 1922.

Application filed May 10, 1920. Serial No. 380,416.

*To all whom it may concern:*

Be it known that I, WILLIAM D. TROUTNER, a citizen of the United States, residing at Pittsfield, in the county of Pike, and State of Illinois, have invented certain new and useful Improvements in Methods and Means for Inserting Teeth in Gears and Pinions, of which the following is a specification.

This invention relates to a method and means for inserting teeth in gears and pinions for the replacement of teeth broken out in use or which may develop flaws in machining from a blank.

It often happens that with the exception of a single tooth, or one or two teeth, a gear or pinion will be absolutely perfect and that the same can only be replaced at considerable expense and inconvenience.

The object of the present invention is to provide a method and means whereby fractured or imperfect teeth in gears and pinions may be replaced by a new tooth or teeth without the expense of subsequently machining the gear over again.

The usual manner of replacing teeth in gears by welding processes has been to fill in the space between two teeth to form a solid blank portion and then hob the new teeth out just as in machining the original blank. This method is expensive and slow and the final cost is often as great as it would be to replace the gear.

In the present invention the fractured tooth or teeth are cut down to the root or base and a new tooth cut from previously formed bar stock is clamped in place and welded to the root or base, no machining being necessary, inasmuch as the tooth is the exact shape and only requires dressing with a file to remove the slightly irregular surface at the root of the inserted tooth.

Figure 2:
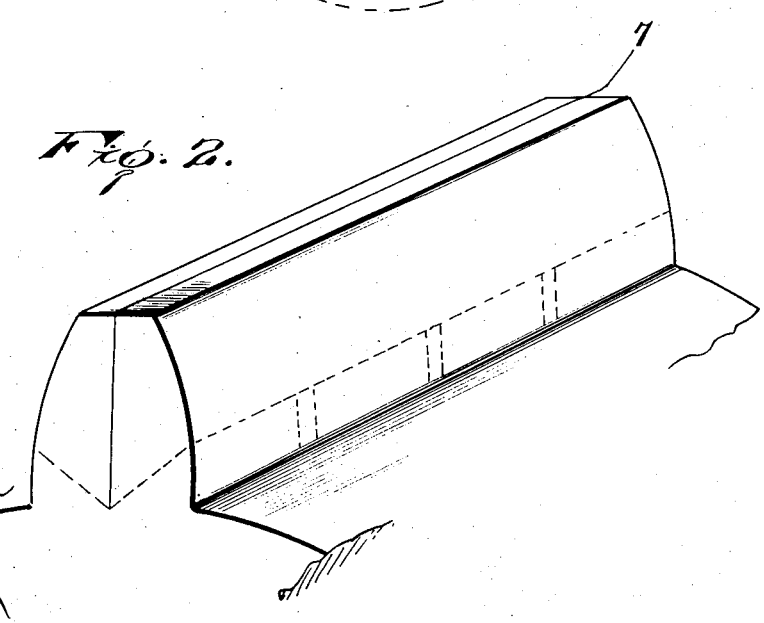

In the drawings,

Figure 1 shows a pair of intermeshing pinions and indicates diagrammatically the manner in which the tooth is replaced, Figure 2 is a perspective view showing a completed inserted tooth, Figure 3 is a view in perspective showing the tooth clamped in place ready for welding, Figure 4 is a perspective view of one form of bar stock from which the tooth may be cut, Figure 5 is a perspective view of another form of bar stock from which the tooth may be cut.

In detail:

The invention, as herein shown, indicates a gear or pinion body 1 having teeth broken out and new teeth 2 welded therein, as shown in Figure 1. In preparing the pinion body for welding in a broken tooth, the root of the broken tooth is cut away clear down to the depth of the clearance space of the gear or pinion, as indicated at 3 in Figure 1.

The tooth to be inserted is cut from bar stock kept on hand by the welder and which bar stock is of substantially the same configuration, in cross section, as the gear tooth. Such a piece of bar stock is clearly shown in Figure 4, the root or base face thereof being beveled on each side, as shown at 4, and provided with transverse ribs 5 having seating faces which are adapted to support the tooth length in position previous to actual welding. The object of having the root or base space of the bar stock beveled is to provide for filling in with new metal.

Now, referring to Figure 3, in replacing a gear tooth the gear body is prepared as previously described, and the requisite length of bar stock is cut and placed on the gear body, as indicated at 6. The bar stock is provided with a scribe line 7 on the face thereof so that the operator may properly position the tooth for circular pitch. After the tooth has been thus positioned a clamp 8 is placed on the gear body and tooth and the jaw member 9 screwed down upon the tooth to hold it in place. This leaves spaces 10 to be filled in with new metal in the molten state and of a welding temperature sufficient to form a homogeneous structure including the root of the new tooth, the transverse rib and the gear body so that when the weld is completed, as indicated at 11 in Figure 1, the inserted tooth is as much a part of the original gear as the tooth which was broken out.

The object of beveling the root face of the inserted tooth is to provide for filling in the metal during welding without the necessity of cutting away the gear body beyond the clearance depth.

A gear thus provided with an inserted tooth need only be dressed down at this point with a file, whereas with the usual method of filling the space between two teeth, the filled in space must be hobbed out in order to obtain a proper tooth, thus requiring not only considerable time but entailing more expense than is the case with the tooth inserted according to the method set forth in this invention.

The bar stock may be cast or otherwise formed of semi-steel or other material suitable for use as teeth in gears and at the same time having the proper qualities for welding.

This method of welding also makes a better job than can be done with the use of carbon blocks and saves the time and expense incident to fitting in the carbon blocks between the teeth of the gear when endeavoring to weld an individual tooth in place.

It is apparent that the construction of the bar stock may be modified in some particulars from that shown in Figure 4, as for instance, in the larger sizes it may be desirable to provide staggered seating elements 12, as shown in Figure 5. This is particularly advantageous in insetting teeth of wide gear face and where the inset tooth is of such length that clamping, as indicated in Figure 3, might deflect the tooth to a certain extent unless it is amply supported at the root.

I claim:

1. The herein described method of welding in gear teeth which consists in dressing the gear body down to the clearance line, clamping in a previously shaped tooth beveled at the root to receive welding metal, and depositing the welding metal at a temperature to homogenize the root of the tooth with the gear body.

2. As an article of manufacture, a bar stock gear tooth for welding in teeth on broken gears, and having a series of supporting members carried thereby.

3. As an article of manufacture, a bar stock gear tooth for welding in teeth on broken gears and having a beveled root for receiving the welding material.

4. As an article of manufacture, a bar stock gear tooth for welding in teeth on broken gears, and having a beveled root provided with spaced supporting members.

5. As an article of manufacture, a bar stock gear tooth for welding in teeth on broken gears, and having a beveled root provided with staggered spaced supporting members.

In testimony whereof I affix my signature.

WILLIAM D. TROUTNER. [L. S.]